Oct. 4, 1927. H. E. HOOVER Re. 16,763

SUCTION SWEEPER

Original Filed Jan. 2, 1920 4 Sheets-Sheet 1

INVENTOR

Howard Earl Hoover

H. J. Timaeus

ATTORNEY

Oct. 4, 1927. H. E. HOOVER Re. 16,763

SUCTION SWEEPER

Original Filed Jan. 2, 1920 4 Sheets-Sheet 2

INVENTOR
Howard Earl Hoover
H. S. Duarte
ATTORNEY

Oct. 4, 1927. H. E. HOOVER Re. 16,763

SUCTION SWEEPER

Original Filed Jan. 2, 1920 4 Sheets-Sheet 3

INVENTOR

Howard Earl Hoover

H. S. Dimarez

ATTORNEY

Oct. 4, 1927. H. E. HOOVER Re. 16,763

SUCTION SWEEPER

Original Filed Jan. 2, 1920 4 Sheets-Sheet 4

INVENTOR
Howard Earl Hoover
H. J. Demarest
ATTORNEY

Reissued Oct. 4, 1927. Re. 16,763

UNITED STATES PATENT OFFICE.

HOWARD EARL HOOVER, OF GLENCOE, ILLINOIS, ASSIGNOR, BY MESNE ASSIGNMENTS, TO THE HOOVER COMPANY, OF NORTH CANTON, OHIO, A CORPORATION OF OHIO.

SUCTION SWEEPER.

Original No. 1,483,977, dated February 19, 1924, Serial No. 348,746, filed January 2, 1920. Application for reissue filed December 14, 1925. Serial No. 75,459.

My invention relates to suction sweepers and particularly to suction sweeper casings. It has for one object to provide a two-part casing with a removable floor plate and for another, to provide a converter attachment particularly adapted for use with such construction.

In suction sweepers of the type employing motor driven brushes it is necessary to get at the brush adjusting and driving means. This may be necessary for purposes of adjustment and repair or in the case of a belt driven brush, to remove or renew the belt. Heretofore, it has been customary to accomplish this by providing an opening in the bottom of the sweeper casing. In my improved form, I provide a removable bottom of floor plate for the casing. With it removed, the entire interior of the suction chamber with all that it contains, is readily accessible.

In order to clean at a distance from the sweeper it is customary to connect a hand tool by means of a converter to the casing and source of suction. For this purpose, it is preferable to have the connection between the tool and the suction source as direct as possible. In the form of my invention the connection is directly with the fan chamber. By such a connection the dust laden air from the suction tool is drawn directly to the fan chamber and is not passed needlessly over or through the brush or about the suction nozzle or brush chamber. This arrangement is made particularly efficient and convenient by the removable floor plate.

My invention is illustrated more or less diagrammatically in the accompanying drawings wherein.

Like parts are indicated by like characters throughout the drawings.

Figure 1:
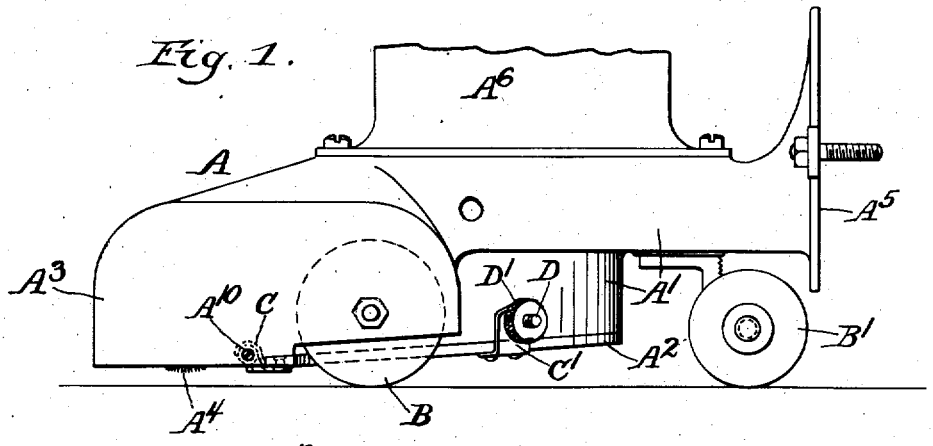
Figure 1 is a side elevation of my sweeper with parts omitted.
Figure 2:
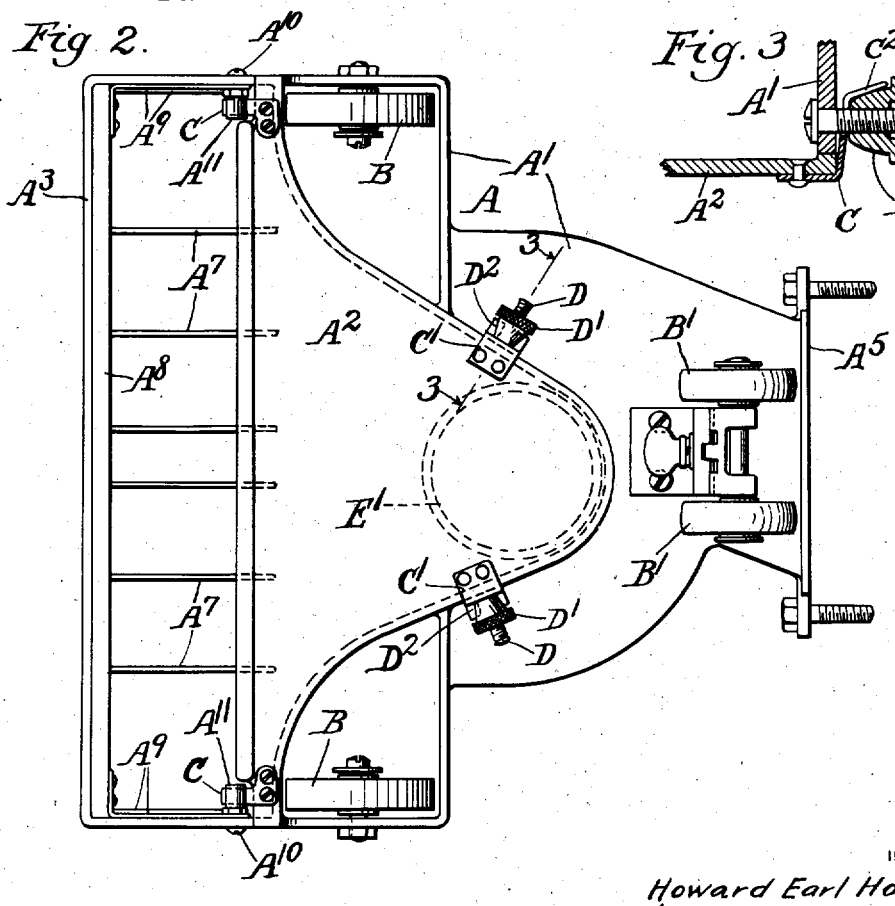
Figure 2 is a bottom view with brush removed and with parts omitted.
Figure 3:
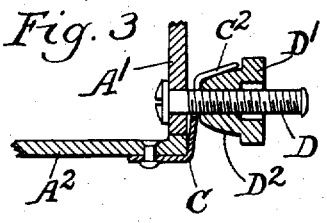
Figure 3 is a vertical section along the line 3—3 of Figure 2.

A is a suction sweeper casing composed of an upper part $A^1$ and a lower removable floor plate $A^2$. $A^3$ is a suction nozzle in which is mounted a rotary brush $A^4$. $A^5$ is a discharge opening through which the dust laden air passes from the sweeper. $A^6$ is a motor housing mounted upon the casing. $A^7$ $A^7$ are guard fingers mounted in the bar $A^8$ and extending across the suction nozzle $A^3$. $A^9$ $A^9$ are a plurality of adjustable brush supporting plates pivotally mounted on screws $A^{10}$ $A^{10}$. $A^{11}$ $A^{11}$ are nuts extending from screws $A^{10}$ $A^{10}$.

B B are wheels supporting the forward part of the casing. $B^1$ $B^1$ are adjustably mounted wheels under and supporting the rear of the casing.

C C are hooks mounted on the floor plate $A^2$ and adapted to engage the nuts $A^{11}$ $A^{11}$. $C^1$ $C^1$ are lugs mounted on the floor plate $A^2$ and slotted as at $C^2$ $C^2$ for engagement with the bolts D which are mounted in and extend laterally from the casing part $A^1$. $D^1$ $D^1$ are thumb nuts upon the bolts D D provided with the inner cone faces $D^2$ adapted progressively to engage the slotted lugs $C^1$ $C^1$, and thus to co-operate and secure the two parts of the casing together.

E is the bottom of the fan chamber apertured as at $E^1$, the edges of the aperture being beveled as at $E^2$. $E^3$ is a converter connection communicating with the conduit $E^4$. $E^5$ is a part integral with the connection $E^3$. $E^6$ $E^6$ are lugs similar to the lugs $C^1$ $C^1$ and adapted to co-operate with the bolts D D and the thumb nuts $D^1$ $D^1$ to secure the converter to the casing.

F is another form of converter connection. It is provided with lateral projections $F^1$ $F^1$ on which are mounted lugs $F^2$ $F^2$ for co-operation with the bolts D D and thumb nuts $D^1$ $D^1$ in a manner similar to the lugs $C^1$ $C^1$. $F^3$ is a forward extension from the converter connection F, connected to the conduit $E^4$.

G G are rods extending laterally from the extension $F^3$. $G^1$ $G^1$ are yokes mounted on them and adapted to extend across the suction nozzle. $G^2$ $G^2$ are wheels mounted for rotation on the shafts G G. By means of these wheels and their mountings, the forward end of the casing is supported above the floor and the casing may thus be moved about in the usual manner.

H is a fan mounted in the casing and provided with the extension $H^1$ which has at its lower end the belt pulley $H^2$.

I is a belt driven by the pulley $H^2$ and adapted to drive the rotary brush $A^4$.

J is a further modified form of converter having a widened and flattened portion $J^1$. This construction is designed to flatten the converter without decreasing the cross sectional area of the passage through it.

K K are projections extending laterally from and integral with the converter J. On them are slotted lugs $K^1$ $K^1$ adapted to co-operate with the bolts D D and thumb nuts $D^1$ $D^1$ to secure the converter to the casing part $A^1$.

Although I have shown in my drawings an operative device, many changes might be made in size, shape or arrangement without departing materially from the spirit of my invention, and I wish therefore, that my drawings may be regarded as in a sense, diagrammatic.

Figure 6:
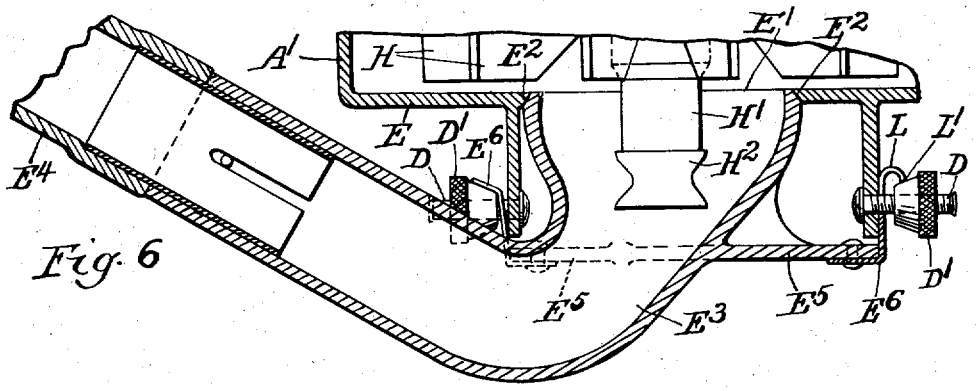
Figure 6 is a vertical section along the line 6—6 of Figure 5 showing a modified form of slotted lug.
Figure 4:
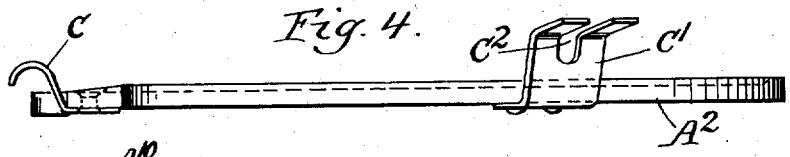
Figure 4 is an elevation of the floor plate.
Figure 5:
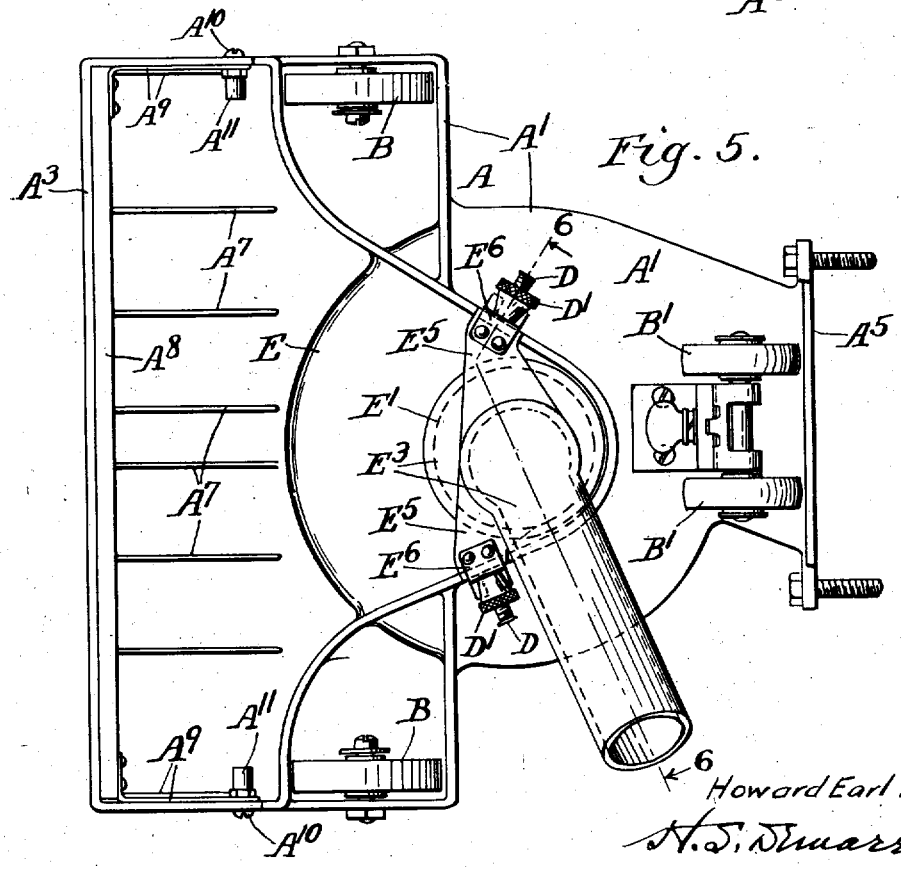
Figure 5 is a bottom view with floor plate and brush removed and one form of converter in place.
Figure 8:
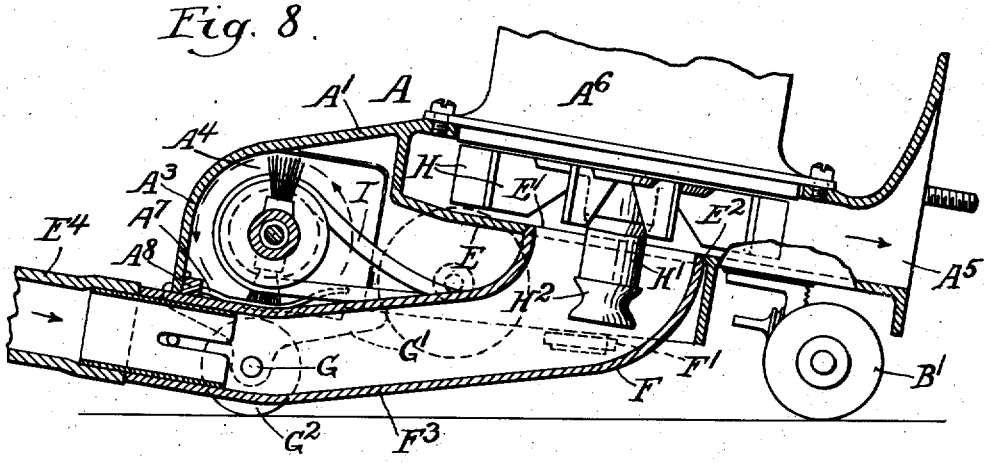
Figure 8 is a vertical section along the line 8—8 of Figure 7 with brush in place.
Figure 7:
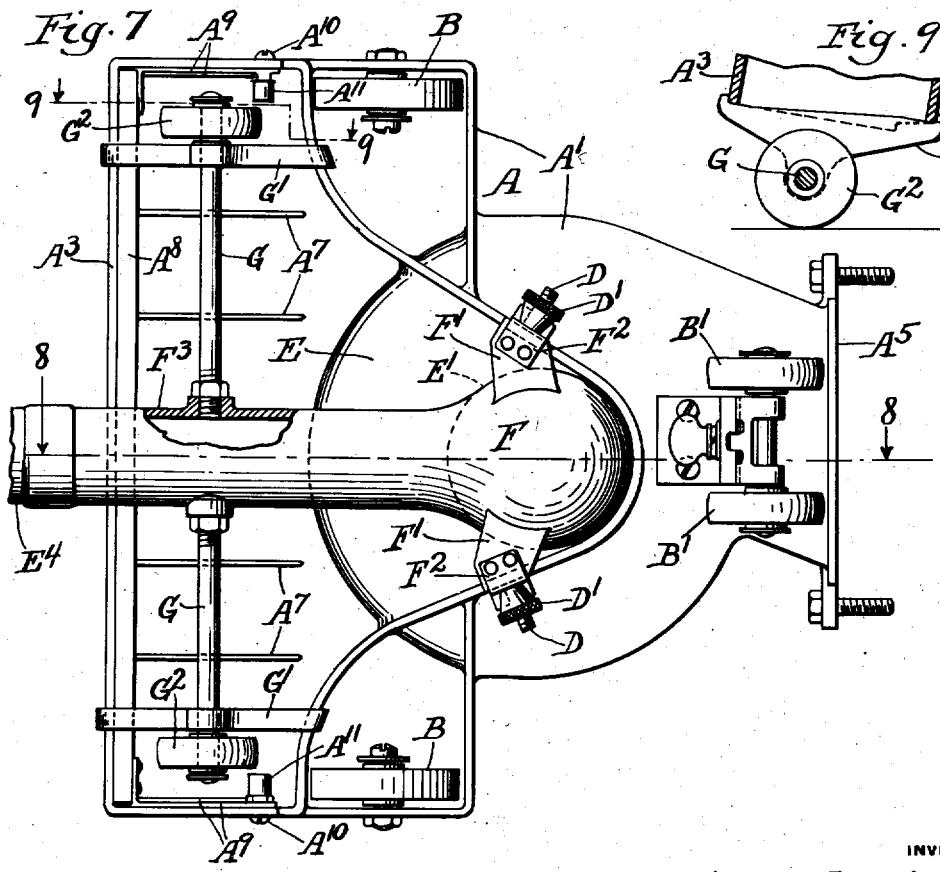
Figure 7 is a view similar to Figure 5 but with a different type of converter in place and brush removed.
Figure 9:
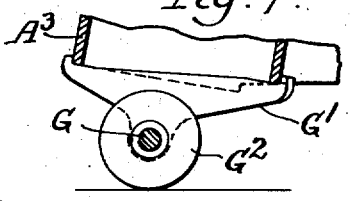
Figure 9 is a vertical section along the line 9—9 of Figure 7.
Figure 11:
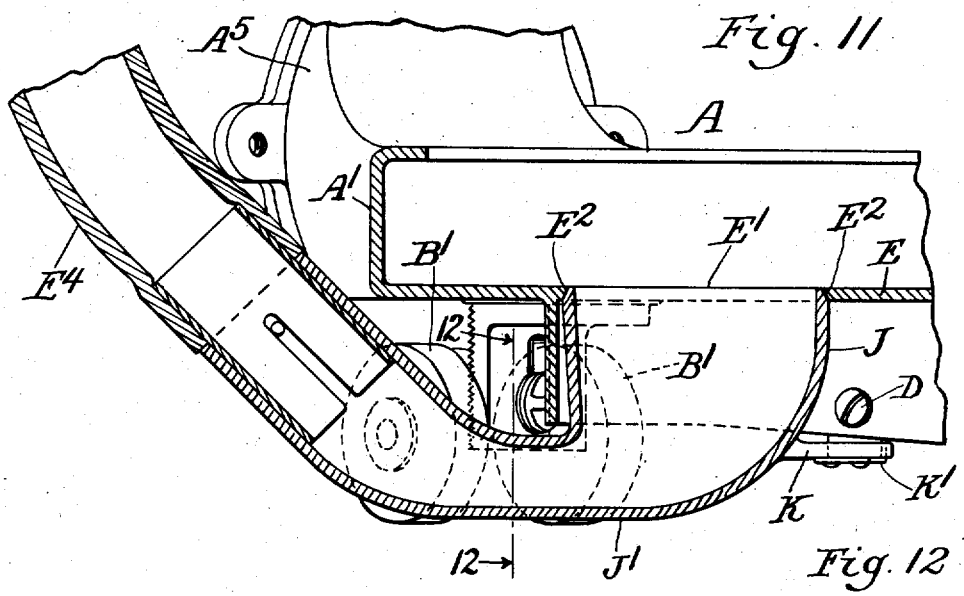
Figure 11 is a vertical section along the line 11—11 of Figure 10.
Figure 12:
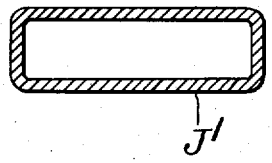
Figure 12 is a vertical section along the line 12—12 of Figure 11.
Figure 10:
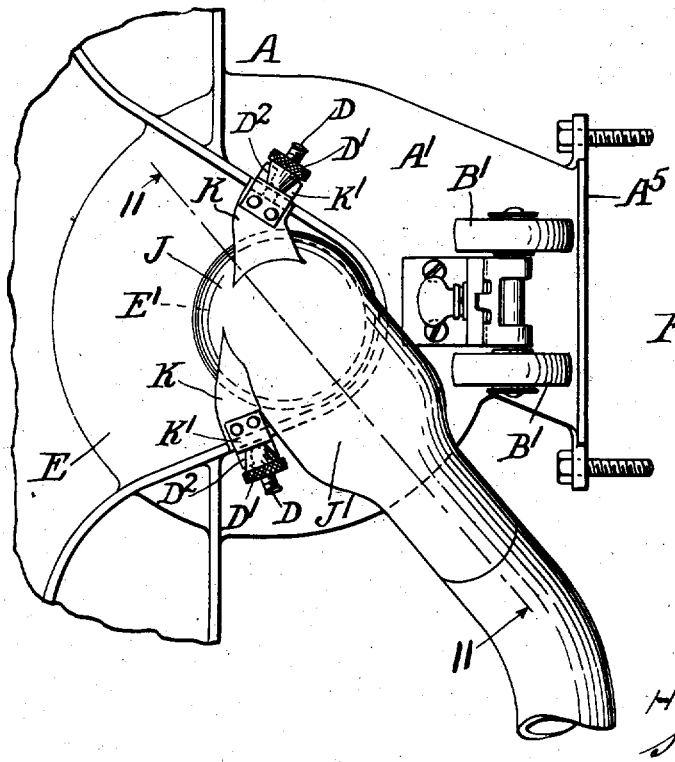
Figure 10 is a detail on an enlarged scale with parts broken away showing the third form of converter in place.

In Figure 6 is shown a modified form of slotted lug. Instead of the usual inclined face adapted to engage the beveled face of the thumb nut, I have curved the end of the lug up in the form of a spring L with the face $L^1$ bearing against the beveled face of the thumb nut. This differs from the structure shown in Figure 5.

The use and operation of my invention are as follows:—

The floor plate normally is in the position shown in Figure 1. It is held there by the hooks at either end which engage the projecting nuts at the pivot points of the brush supporting plates. The slotted lugs toward the rear of the floor plate overlie the bolts extending from the casing and the thumb nuts on the bolts engage and hold the lugs in position to secure the two parts together. The co-operation between the slanting ends of the lugs and the inner beveled face of the thumb nuts is such that if they are tightened, the floor plate is progressively drawn up and held against the casing part $A^1$. To remove the plate these nuts are loosened so as to free the rear end of the floor plate which is then raised. The hooks at the forward edge of the plate are thus freed and may be disengaged from the nuts and the plate is then removed from the casing, thus the whole interior of the casing and the belt, brush and brush support are exposed for repair, renewal, or adjustment.

After the floor plate is removed, the application of any form of converter is substantially the same. The converter is placed in position over and extending into the passageway leading to the fan chamber, and the slotted lugs upon it are secured by the thumb nuts in the same manner as are those of the floor plate. After these nuts are tightened, the converter is drawn down upon and into the opening in the floor of the fan chamber. In the second form of converter, the mode of attachment is the same but the hose connection extends forward, and the two yokes supporting the auxiliary wheel attached to it, extend across and rest upon the edges of the suction nozzle proper of the casing, thus the forward end of the casing is raised above the floor and is supported upon the auxiliary wheels so that the sweeper may be moved from place to place in the usual manner.

The third form of converter is attached in a manner similar to the first form. It is, however, flatter, and therefore, takes up less room and the machine itself may be upright after this form of converter has been applied.

By the term "suction chamber", I mean to refer to that chamber which lies near and is connected with the fan chamber and contains that portion of the driving mechanism which is likely to require inspection and care. Forward of the suction chamber is what might be called an inlet chamber or when the brush is used, a brush chamber. This chamber, of course, needs no bottom or bottom plate because it is through the bottom of this chamber or portion of the chamber that the dust laden air enters. There might be other than brush driving mechanisms which could be contained in the suction chamber and require inspection and treatment, so I wish the term "suction chamber" to be taken in its broad sense. While I prefer to use a brush and so indicate in the drawings, any kind of carpet agitating device could be utilized and as above suggested could be altogether omitted. The plate could of course, be sectional if desired, but I prefer to make it in one piece. Its inner surface practically forms substantially the entire bottom of the suction chamber, and is free from obstructions. The brush chamber and the wheel chambers require no cover. The suction chamber must have a bottom whose form is imperforate, although it covers the hole between the fan and suction chambers. It is removable if necessary to cover such hole for application thereto of the hose connection.

I claim:—

1. A suction cleaner casing having a fan chamber, a suction chamber, and an inlet chamber having a mouth, in combination with a removable plate which when in position forms a wall of such suction chamber and a lip of said mouth, the fan chamber having an inlet opening adapted to receive a converter which extends into the suction chamber and connects with said inlet opening when the plate is removed.

2. A suction cleaner casing having a fan chamber, a suction chamber, and an inlet chamber having a mouth, in combination with a removable plate which when in position forms a wall of such suction chamber and a lip of said mouth, the fan chamber having an inlet opening adapted to receive a converter which extends into the suction chamber and connects to said inlet opening when the plate is removed, the converter provided with a generally lateral conduit connection lying in part within the suction chamber.

3. A suction cleaner casing having a fan chamber, and a suction chamber in combination with a removable plate, which when in position forms a wall of such suction chamber, and means adapted to secure said plate to said casing and to draw them progressively closer together, said means including a slotted spring member on said plate and a co-operating pin member on said casing, said slotted member provided with faces angular to the axis of said pin member and a movable securing member on said pin member provided with an inwardly beveled face for co-operation with the face of said slotted member whereby said plate is drawn progressively against said casing.

4. A suction cleaner casing having a fan chamber and a suction chamber, there being provided in the wall therebetween an opening, in combination with a removable plate which when in position forms an entire wall of such suction chamber, and means adapted to secure said plate to said casing and to draw them progressively together, said means including slotted members on said plate and co-operating pin members on said casing, the opening in the wall between the fan and suction chambers being adapted to receive a converter which enters the suction chamber and connects with the fan chamber when the plate is removed and attaching means on said converter adapted to co-operate with said pin members to secure said converter to said casing.

5. A suction cleaner casing having a fan chamber and a suction chamber, in combination with a removable plate which when in position forms a wall of such suction chamber, the fan chamber having an intake adapted to receive a converter which enters the suction chamber when the plate is removed and connecting with the fan intake, said converter provided with a conduit connection in combination with a supporting frame adapted to contact and support the forward end of said casing, widely separated wheels mounted on said frame and adapted to contact the floor beneath said casing.

6. A suction cleaner casing comprising a fan chamber and a suction chamber with an opening therebetween, and an inlet mouth, a detachable imperforate plate which forms a wall of the suction chamber and an edge of the inlet mouth and which overlies the opening between the fan chamber and suction chamber, said plate provided with a relatively smooth and unobstructed upper face to form the lower wall of the suction chamber.

7. A converter attachment for a vacuum cleaner provided with a mouth for connection with said cleaner and having lateral extensions, supporting members on said extensions adapted to receive said cleaner and support it and supporting wheels on said extensions.

8. A suction sweeper casing casting comprising a cylindrical member having a central opening in the top thereof and a smaller central opening in the bottom thereof, an open bottom member integral therewith and formed by a depending outwardly flared wall terminating forwardly in an inlet chamber.

9. In a suction cleaner casing, a cast metal fan chamber having an inlet opening, a collecting nozzle having its top side integral with said fan chamber and its bottom side formed with an open channel which communicates with said opening, and a bottom plate detachably secured to said nozzle and completing said channel.

10. In a suction cleaner casing, a cast metal fan chamber having integral therewith the top, sides, and forward lip of a collecting nozzle in combination with a separately formed bottom plate which completes said nozzle and has an edge spaced from said first lip to define an inlet mouth, the opposite part of the nozzle interior communicating with the interior of said fan chamber.

Signed at Chicago, in the county of Cook, and State of Illinois, this 9th day of December, A. D. 1925.

HOWARD EARL HOOVER.